United States Patent [19]

Teruyama et al.

[11] Patent Number: 5,075,585
[45] Date of Patent: Dec. 24, 1991

[54] ROTARY MACHINE

[75] Inventors: Hidetoshi Teruyama; Yukio Aoki, both of Aichi, Japan

[73] Assignee: Mitsubishi Denki Kabushiki Kaisha, Tokyo, Japan

[21] Appl. No.: 531,411

[22] Filed: May 31, 1990

[30] Foreign Application Priority Data

Sep. 25, 1989 [JP] Japan .................. 1-248502

[51] Int. Cl.$^5$ .................. H02K 15/04; H02K 5/00
[52] U.S. Cl. .................. 310/89; 29/596; 310/42
[58] Field of Search .................. 310/42, 89, 90, 91, 310/254; 29/596, 598

[56] References Cited

U.S. PATENT DOCUMENTS

| 3,758,799 | 9/1973 | Dochterman et al. | |
| 3,874,073 | 4/1975 | Dochterman et al. | |
| 4,955,128 | 9/1990 | Sogabe et al. | 29/596 |

FOREIGN PATENT DOCUMENTS 1450501 9/1976 United Kingdom .

Primary Examiner—Carl E. Hall
Attorney, Agent, or Firm—Rothwell, Figg, Ernst & Kurz

[57] ABSTRACT

A rotary machine having a stator assembly constructed by joining brackets to a stator core by all-round laser welding without entailing the thermal deformation of those components. The omission of through-bolts for fastening together the stator core and the brackets and the resultant omission of through holes in the stator core for receiving the through-bolts reduces the outside dimensions of the laminations of the stator core. Superfluous spaces in the stator assembly are filled with a resin to prevent the condensation of moisture attributable to temperature variation within the rotating machine, to provide the rotating machine with a high rigidity, to suppress vibrations and to enhance heat transfer from the stator coils to the brackets.

4 Claims, 4 Drawing Sheets

ROTARY MACHINE

BACKGROUND OF THE INVENTION

1. Field of the Invention

The present invention generally relates to a rotary machine having a stator core with exposed outer circumference, and to a process for manufacturing such a rotating machine.

2. Description of the Prior Art

FIG. 1 is a side view partly in longitudinal section showing a conventional electric motor and FIG. 2 is a front view of a lamination of a laminated stator core employed in the electric motor shown in FIG. 1.

Referring to FIGS. 1 and 2, there are shown a laminated stator core 1 formed by a plurality of stator core laminations having a thickness of about 0.5 mm, a stator coil 2 wound on the stator core 1 and end plates 3 attached respectively to both ends of the stator core 1, brackets 4 formed of a steel plate, fastened to the stator core 1 by through bolts 5 and nuts 6, and holding bearings 7 in their bearing outer ring portions, a shaft 8 supported by the bearings 7, and a rotor core 9 fixedly mounted on the shaft 8.

The stator core 1 and the end plates 3 are welded by tungsten inert gas welding (hereinafter, referred to as "TIG welding") while they are compressed. Then, a stator core 1, i.e., the assembly of the stator core 1 and the end plates 3, is subjected to finish machining (hereinafter, referred to as "sizing") to machine the end plates 3 to a size and shape conforming to those of the corresponding portions of the brackets 4. The bearing portions for holding the bearings 7 and end plate receiving portions of the brackets 4 are also machined. In assembling the electric motor, the stator assembly of the stator core 1, end plates 3 and wound stator coil 2 on the stator core assembly and the brackets 4 are fastened together the brackets 4 by the through-bolts 5 and the nuts 6. The nuts 6 may be substituted by threaded holes formed in one of the brackets 4.

This electric motor is not provided with any housing to cover the stator core 1, and the outer circumference of the stator core is exposed.

Thus, the conventional electric motor is manufactured by individually subjecting the assembly of the stator core 1 and the end plates 3 welded to both ends of the stator core 1, and the brackets 4 to sizing, and fastening the brackets 4 to the stator assembly (stator core 1, end plates 3 and stator coil 2) with the through-bolts 5 and the nuts 6. Accordingly, such a conventional electric motor and the process of manufacturing the same have the following problems.

(1) It is difficult to assemble the stator core 1 and the end plates 3 with the bore of the stator core 1 and the bearing portions of the brackets 4 disposed relative to each other at a high concentricity. The sizing of the end plates 3 with reference to the bore of the stator core 1 and the sizing of the bearing portions of the brackets 4 for holding the bearings 7 are performed separately. Consequently, machining error in the end plates 3 and in the bearing portions of the brackets 4 are accumulated. The accumulated error is greater than the machining error in the bearing portions of the brackets 4 relative to the bore of the stator core 1 when the bearing portions of the brackets 4 are sized directly with reference to the bore of the stator core 1.

(2) The holes in the stator core 1 for receiving the through-bolts 5 require an additional area, which increases the quantity of material for forming the stator core 1 and increases the weight and cost of the electric motor.

(3) In joining together the assembly of the stator 1 with the end plates 3 and the brackets 4, a liquid sealant is applied to the joining surfaces of the end plates 3, and then the brackets 4 are fastened to the assembly of the stator core 1 and the end plates 3. If the liquid sealant is applied irregularly to the joining surfaces of the end plates 3 or if the application of the liquid sealant is forgotten, the insulation of the electric motor is deteriorated by the leakage of external liquids such as a grinding coolant into the electric motor.

(4) When one of the four through-bolts 5 is loose, the mechanical strength of the electric motor to withstand a bending force, such as the tension of a belt acting on the rotor shaft 8, and the rigidity of the motor are reduced, then and the parts of the electric motor thus resonate with external vibrations to generate noise.

SUMMARY OF THE INVENTION

Accordingly, it is an object of the present invention to provide a compact rotary machine having a high quality and capable of being manufactured at a reduced cost.

It is another object of the present invention to provide a process for manufacturing a compact rotary machine having a high quality at a reduced cost.

In one aspect of the present invention, a rotary machine comprises a stator assembly constructed by combining a stator core and brackets in an integral unit by laser welding.

In another aspect of the present invention, a rotary machine comprises a stator assembly constructed by combining a stator core and brackets in an integral unit by laser welding, and the superfluous spaces in the stator assembly are filled with a resin.

In still another aspect of the present invention, a process for manufacturing a rotary machine comprises effective steps of manufacturing any one of the above described rotary machines.

The above and other objects, features and advantages of the present invention will become more apparent from the following description taken in conjunction with the accompanying drawings, which are intended only to illustrate the invention and are not to be construed to limit the scope of the invention.

DETAILED DESCRIPTION OF THE PREFERRED EMBODIMENTS

Figure 1:
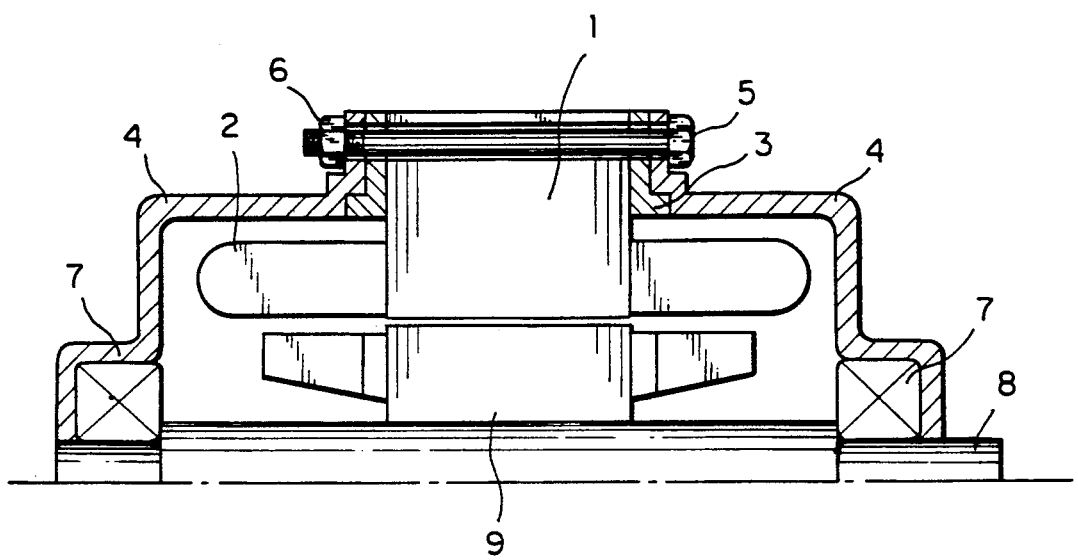
FIG. 1 is a side view partly in longitudinal section showing a conventional electric motor.
Figure 2:
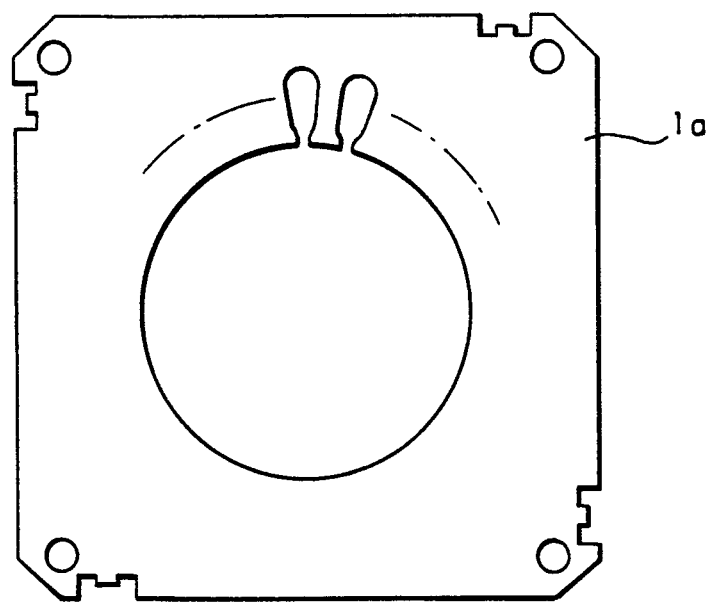
FIG. 2 is a front view of a lamination of the stator core of the electric motor shown in FIG. 1.
Figure 3:
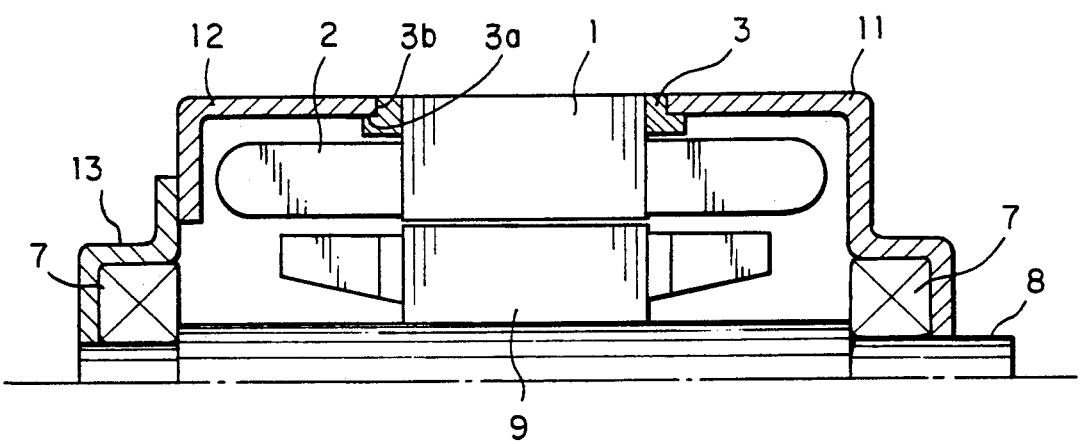
FIG. 3 is a side view partly in longitudinal section showing a rotary machine according to a first embodiment of the present invention.
Figure 4:
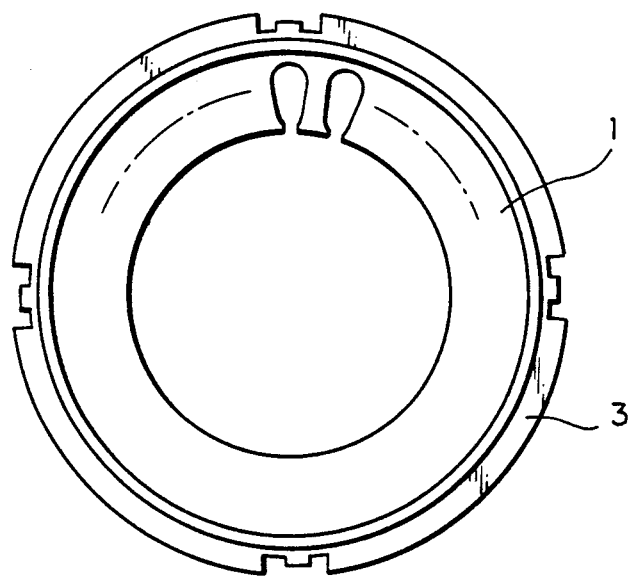
FIG. 4 is a front view of a lamination of the stator core of the rotary machine shown in FIG. 3.

Referring to FIGS. 3 and 4 illustrating a rotary machine in a first embodiment according to the present invention, an end plate 3 includes a sized portion 3a and a butt surface 3b a bracket 11 formed of a steel plate is joined to one end plate 3 by laser welding, a bracket 12 formed of a steel plate is joined to the other side of end plate 3 by laser welding, and a bearing housing 13 for holding a bearing 7 is fastened to the bracket 12 with screws, not shown.

Thus, the stator core 1 and the end plates 3 are joined together by welding along their respective outer circumferences or rivet caulking through the core. The brackets 11 and 12 are laser-welded to the sized portions 3a of the end plates 3 to construct the stator assembly Stator coils 2 are put on the stator core 1 before joining the end plates 3 to the stator core 1.

Laser welding generates less heat than conventional welding, such as metal inert gas welding (hereinafter, referred to as "MIG welding") and hence is advantageous over the conventional welding in that the work piece welded by laser welding is less subject to thermal deformation. When the end plates 3 are joined to the bracket 11 by all-around MIG welding, insulators, such as polyester films or the like, placed in the slots for the stator coils 2 may be damaged by heat. Spot welding is disadvantageous in tightness and seal effect Butt welding by means of the laser welder can achieve sufficient welding depth even in the case of all-around butt welding, as a result of generating a smaller amount of heat.

In the butt welding, a sufficient welding depth can be obtained by irradiating the laser beam on the butt surface 3b of the end plate 3 butting with the bracket 11 from the direction of the outer periphery. Since the end plate 3 has the sized portions 3a (a male or female) fitting with the bracket 11, the laser beam never penetrates through the sized portions 3a into the inside even if the butt surface 3b has an inferior flatness, so that the coil can be protected from damage. Furthermore, through-bolts fastening the stator core become unnecessary, so that the stator core can be reduced to the minimum in size The bearing housing 13 is fastened to the bracket 12 with screws after assembling a rotor assembly, i.e., an assembly of the rotor shaft 8 and the rotor 9, and the stator assembly to complete the electric motor. When the electric motor need not be disassembled, the bearing housing 13 may be joined to the housing 12 by laser welding after assembling the stator assembly and the rotor assembly The stator assembly thus constructed by joining the end plates 3 to the stator core 1 by all-around laser welding and joining the brackets 11 and 12 respectively to the end plates 3 by all-around laser welding is advantageous over the conventional stator assembly constructed by fastening the components together with the through-bolts 5, and is capable of suppressing vibrations. The tight construction of the stator assembly improves the reliability of the electric motor. Since the stator assembly is machined before joining the bearing housing 13 to the bracket 12 to finish the bore of the stator core 1 and the bearing portion of the bracket 11 simultaneously to achieve concentricity of the bore of the stator core 1 and the bearing portion of the bracket 11, the concentricity of the bore of the stator core 1 and the bearing portion of the bracket 11 of the electric motor of the present invention is higher than that of the bore of the stator core 1 and the bearing portions of the brackets 4 of the conventional electric motor, which are machined individually.

Figure 5:
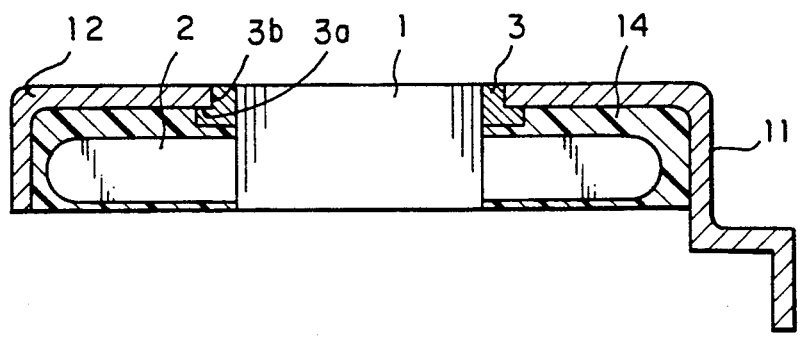
FIG. 5 is a fragmentary longitudinal sectional view of an essential portion of a rotary machine according to a second embodiment of the present invention.

FIG. 5 shows a rotary machine in a second embodiment according to the present invention. The rotary machine shown in FIG. 5 is substantially the same in construction as that shown in FIG. 3, except that empty spaces in the former are filled with a resin 14 to improve the quality and reliability of the rotary machine.

Referring to FIG. 5, the superfluous spaces in the stator assembly defined by the stator core 1, the brackets 11 and 12 are filled with the resin 14 before joining the bearing housing 13 to the bracket 12.

The resin 14 is selected from among those having a high heat conductivity, a small thermal expansion coefficient, high adhesive property, short setting time and a low cost to secure efficient heat transfer from the stator to the brackets 11 and 12, firm, stable adhesion to the brackets 11 and 12 and high productivity of the manufacturing process The resin 14 is, for example, a composite resin containing a filler, such as alumina or silica, and a catalyst. Excessive filler increases the viscosity of the resin excessively to deteriorate the filling performance and forms cavities. It is effective to fill the superfluous spaces in the stator assembly with the resin 14 by an injection molding process such as a liquid transfer molding process disclosed in Japanese Patent Laid-open (KOKAI) No. 57-74535, which uses a liquid to apply pressure to the resin. Since the resin is injected by the liquid, gaps between the laminations of the stator core 1 can be filled with the resin to prevent the penetration of foreign matter, such as a grinding coolant into the stator core 1. The resin 14 filling the superfluous spaces in the stator assembly increases heat transfer from the stator coils 2 to the brackets 11 and 12.

Experiments proved that the resin 14 reduced temperature-rise in the stator coils 2 by 15 to 20%. A resin 14 prepared by mixing silica and alumina as fillers in an epoxy resin for use as the resin 14 had a heat conductivity of 1 kcal/m.hr.°C., which is far greater than the heat conductivity of ordinary resins in the range of 0.1 to 0.2 kcal/m.hr.°C. The use of the resin 14 reduced the temperature-rise in the stator coils 2 and extended the life of the insulators. Filling the gaps between the laminations of the stator core 1 improved the rigidity of the stator core 1 and reduced magnetic noise. It is inferred that the resin 14 filling the slots of the stator core 1 and gaps between the wires of the stator coils 2 suppresses the magnetic agitation of the stator core 1 and the stator coils 2 attributable to magnetic tension When the electric motor is used at a frequency, for example, in the range of 1000 to 2000 Hz, the magnetic noise generated by the electric motor of the present invention was lower than that generated by the equivalent, conventional electric motor by 5 to 10 dBA.

A process for manufacturing the rotary machine described above as the embodiment of this invention, will be described hereinafter with reference to flowcharts shown in FIGS. 6 and 7.

Figure 6:
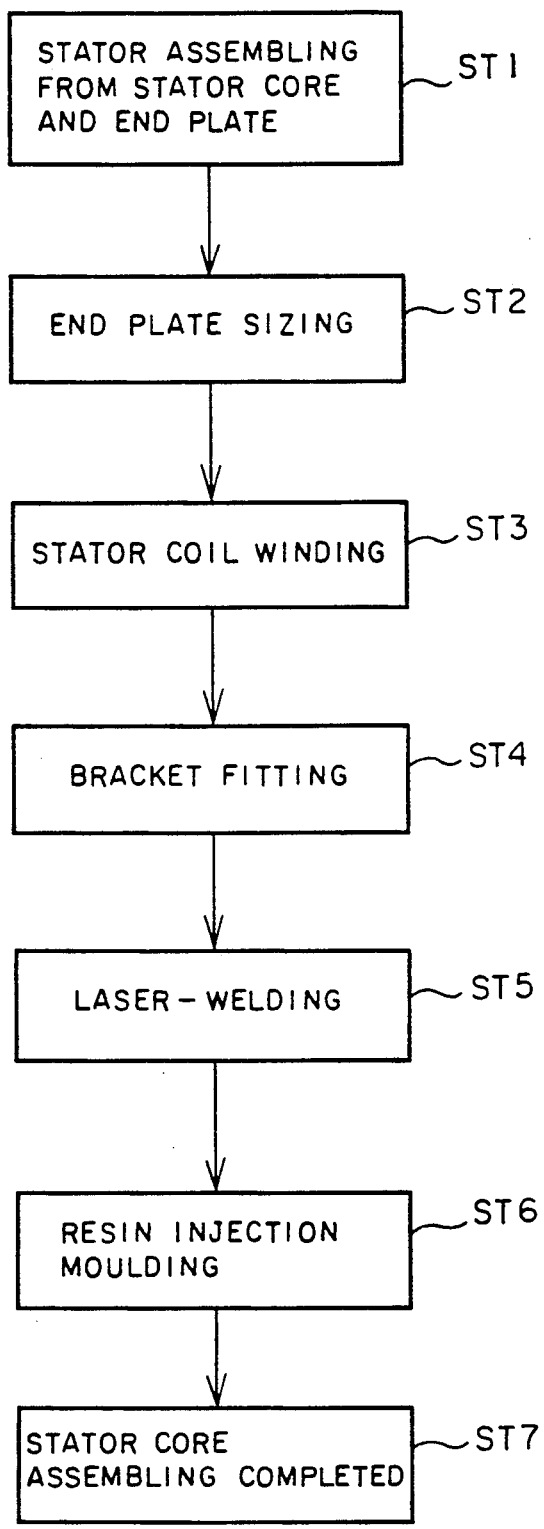
FIGS. 6 and 7 are flow charts each showing a process for manufacturing a rotary machine according to the invention.

FIG. 6 is a flowchart showing a process for assembling a stator assembly comprising steps of: assembling a stator core (step ST1); sizing an end plate (step ST2); winding a stator coil (step ST3); fitting the sized portions of the end plate 3 with brackets 11 and 12, and aligning butt surfaces (step ST4); laser-welding (step ST5); injection molding a resin (step ST6); and completing assembly the stator assembly (step ST7).

A rotor assembly is assembled in parallel with the process for assembling the stator assembly shown in FIG. 6, and then the rotary machine according to the invention is assembled from the stator and rotor assemblies by assembling the bearing portions in the end.

Although in FIG. 6 is shown an example of the process for manufacturing the rotary machine where the injection molding step ST6 is carried out after the laser-welding step ST5, the former step ST6 may be carried out after the fitting step ST4.

Figure 7:
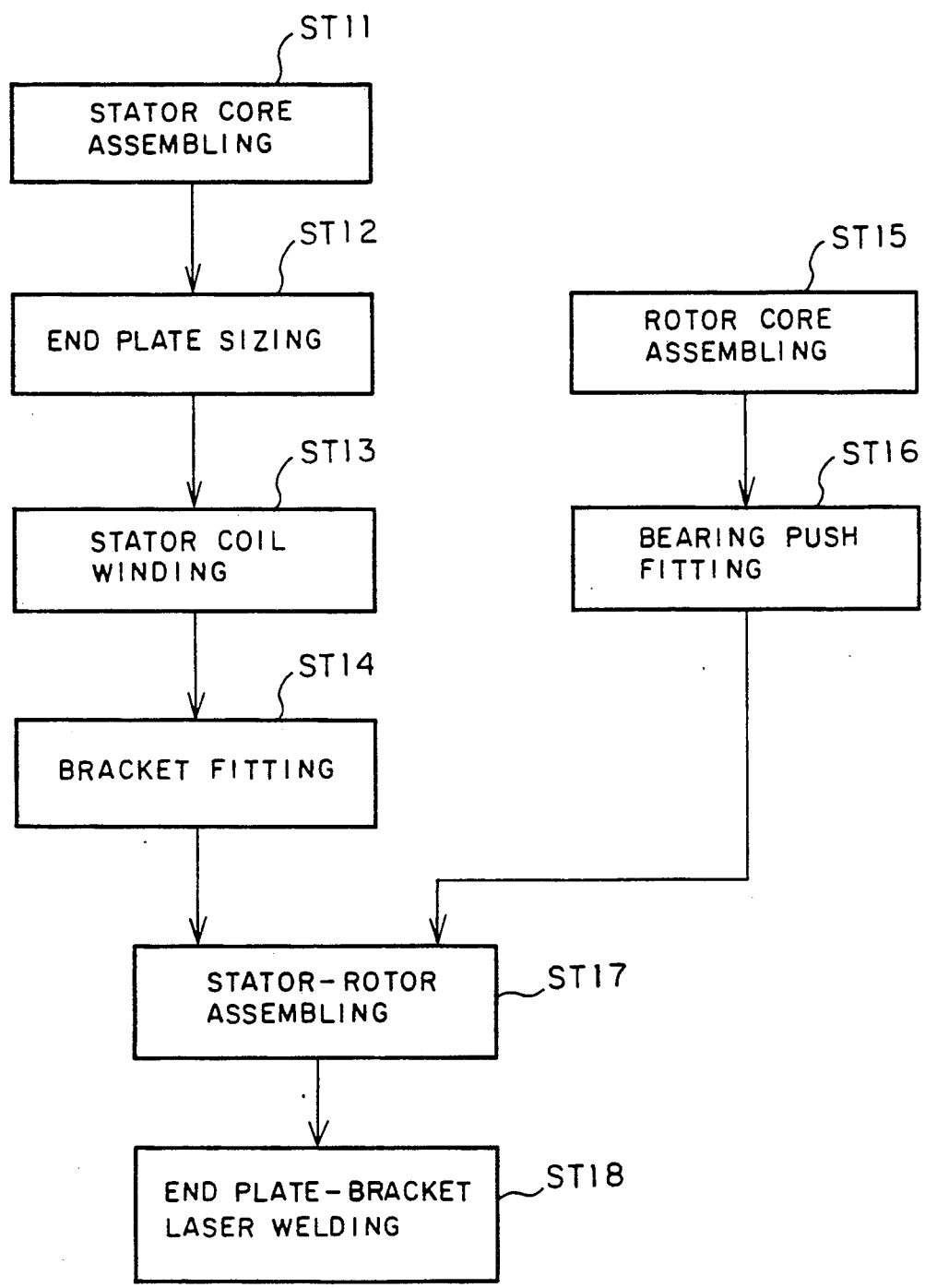

FIG. 7 is a flowchart showing a process for assembling both stator and rotor assemblies comprising the steps of: assembling a stator core (step ST11); sizing an end plate (step ST12); winding a stator coil (step ST13); fitting the sized portions with brackets (step ST14); assembling a rotor assembly (step ST15); push fitting bearings (step ST16); assembling the stator and rotor assemblies (step ST17); and laser-welding (step ST18).

The process shown in FIG. 7 can be applied to manufacturing a canned type rotary machine to be disassembled, realizing a rotary machine being small in size and low in cost.

As is apparent from the foregoing description, according to the present invention, the brackets are joined to the stator core by all-around laser welding to omit the through-bolts without entailing the thermal deformation of those components. Accordingly, the rotary machine can be formed in a compact construction at a reduced cost, having a high rigidity and being capable of silent operation.

Furthermore, filling the superfluous spaces in the stator assembly with the resin prevents the condensation of moisture within the rotary machine attributable to temperature variation, extends the life of the insulators, enhances heat transfer from the stator coils to the brackets, suppresses temperature-rise, and increases the rigidity of the rotary machine to change its characteristic frequency reducing magnetic noise.

Although the invention has been described in its preferred forms with a certain degree of particularity, obviously many changes and variations are possible therein. It is therefore to be understood that the invention may be practiced otherwise than as specifically described herein without departing from the scope and spirit thereof.

What is claimed is:

1. A rotary machine comprising:
a stator core having a periphery which is externally exposed as a casing of said rotary machine, provided with an end plate on a side surface thereof;
a bracket having a bore fitted to a machine sized portion formed on an inner side of the periphery of said end plate relative to said periphery of said stator core and a surface butted to a butt surface formed on an outer side of the periphery of said end plate perpendicular to said inner side;
the butt surface of said end plate and the surface of said bracket being joined together by laser-welding in order to incorporate said stator core and said bracket in one body.

2. A rotary machine as set forth in claim 1, wherein said end plate is fixed to said stator core by tungsten inert gas welding or rivet caulking.

3. A rotary machine as set forth in claim 1, wherein said laser-welding is performed by welding the surfaces of said end plate and said bracket from an outer side of the periphery of said end plate.

4. A rotary machine as set forth in claim 1, wherein a superfluous space formed in the vicinity of a stator coil by said stator core and said bracket, is filled with a resin.

* * * * *

UNITED STATES PATENT AND TRADEMARK OFFICE
CERTIFICATE OF CORRECTION

PATENT NO. : 5,075,585
DATED : December 24, 1991
INVENTOR(S) : Hidetoshi Teruyama et al.

It is certified that error appears in the above-identified patent and that said Letters Patent is hereby corrected as shown below:

Column 1, line 37, delete "and the brackets 4";
line 38, after "together" insert --with--.

Column 2, line 19, delete "then".

Column 3, line 7, after "3b" insert a comma --,--;
line 29, after "effect" insert a period --.--;
line 45, after "size" insert a period --.--;
line 53, after "assembly" insert a period --.--.

Column 4, line 53, after "tension" insert a period --.--.

Signed and Sealed this

First Day of June, 1993

Attest:

MICHAEL K. KIRK

*Attesting Officer*     Acting Commissioner of Patents and Trademarks